United States Patent [19]

Vaughan

[11] Patent Number: 4,666,877

[45] Date of Patent: May 19, 1987

[54] MULTIMETALLIC PILLARED INTERLAYERED CLAY PRODUCTS AND PROCESSES OF MAKING THEM

[75] Inventor: David E. W. Vaughan, Flemington, N.J.

[73] Assignee: Exxon Research and Engineering Company, Florham Park, N.J.

[21] Appl. No.: 756,508

[22] Filed: Jul. 19, 1985

[51] Int. Cl.$^4$ .......................... B01J 20/12; B01J 21/16
[52] U.S. Cl. .................................................... 502/84
[58] Field of Search ................................ 502/80, 84

[56] References Cited

U.S. PATENT DOCUMENTS 4,248,739  2/1981  Vaughan et al. ............... 502/84 X
4,452,910  6/1984  Hopkins et al. ..................... 502/84
4,515,901  5/1985  Elattar ............................ 502/84 X

*Primary Examiner*—Carl F. Dees
*Attorney, Agent, or Firm*—E. Thomas Wheelock; Henry E. Naylor

[57] ABSTRACT

This invention is a composition of matter made up of an expanded smectite clay having multimetallic pillars separating the clay layers. The expanded clay may be used as a shape selective catalyst, catalyst support, or as an adsorbent material. More particularly, this invention relates to expanded smectite clays wherein the pillars are made up of aluminum and one or more transition metals.

19 Claims, 1 Drawing Figure

MULTIMETALLIC PILLARED INTERLAYERED CLAY PRODUCTS AND PROCESSES OF MAKING THEM

FIELD OF THE INVENTION

This invention is a composition of matter made up of an expanded smectite clay having multimetallic pillars separating the clay layers. The expanded clay may be used as a shape selective catalyst, catalyst support, or as an adsorbent material. More particularly, this invention relates to expanded smectite clays wherein the pillars are made up of aluminum atoms and one or more transition metals.

The invention also relates to a method for producing such a composition of matter by the steps of introducing a transition metal ion into aluminum chlorohydrol, i.e., $Al_{13}O_4(OH)_{24}Cl_7$; intercalating the aluminum-transition metal modified chlorohydrol into a smectite clay; drying the clay; and thermally treating it in an inert gas atmosphere to produce the expanded product.

BACKGROUND OF THE INVENTION

Layered naturally occurring and synthetic smectites such as bentonite, montmorillonites and chlorites may be visualized as a sandwich comprising two outer layers of silcon tetrahedra and an inner layer of aluminum octahedra. These clays are generally representable by the general formula:

$$(Si_8)^{iv}(Al_4)^{vi}O_{20}(OH)_4$$

where the iv designation indicates an ion coordinated to four other ions, and the vi designates an ion coordinated to six other ions. The iv coordinated ion is commonly $Si^{4+}$, $Al^{3+}$, or $Fe^{3+}$, but could also include several other four-coordinate ions, e.g., $P^{5+}$, $B^{3+}$, $Ga^{3+}$, $Cr^{3+}$, $Ge^{4+}$, $Be^{2+}$, etc. The vi coordinated ion is typically $Al^{3+}$ or $Mg^{2+}$, but could also include many other possible hexacoordinate ions, e.g., $Fe^{3+}$, $Fe^{2+}$, $Ni^{2+}$, $Co^{2+}$, $Li^+$, $Cr^{3+}$, $V^{2+}$, etc. The charge deficiencies created by substitutions into these cation positions are balanced by one or more cations located between the structure's platelets. Water may be occluded between the layers and either bonded to the structure itself or to the cations as a hydration shell. Commercially available clays of this type include the above mentioned montmorillonite, bentonite, hectorite, beidellite, nontronite, and a host of other smectite materials from hundreds of localities, often having local names and specific compositions.

Normally the clay structure yields repeating plate every 9 Å or thereabouts. Much work has been done to demonstrate that these platelets may be separated further, i.e., interlayered, by insertion of various polar molecules such as water, ethylene glycol, various amines, etc., and that the platelets can be separated by as much as 30 to 40 Å.

Some prior workers have prepared phosphated interlayered clays for use as low temperature traps for slow release fertilizers.

U.S. Pat. Nos. 3,803,026; 3,844,979; 3,887,454; and 3,892,655 describe layered clay-like materials and the process for using these materials. The layered materials are prepared from synthetic solutions of silica, alumina and magnesia salts. The final product has non--exchangeable alumina between the layers and an interlayer spacing greater than about 6 Å. Such a spacing is characteristic of an anhydrous product.

U.S Pat. No. 3,275,757 also discloses synthetic layered type silicate materials as does U.S. Pat. No. 3,252,889. U.S. Pat. No. 3,586,478 discloses a method of producing synthetic swelling clays of the hectorite type by forming an aqueous slurry from a water soluble magnesium salt, sodium silicate, sodium carbonate, or sodium hydroxide and materials containing lithium and fluoride ions. The slurry is hydrothermally treated to crystallize a synthetic clay-like material.

U.S. Pat. Nos. 3,666,407 and 3,671,190 describe other methods of preparing clay-like materials. All of these synthetic clays are acceptable raw materials for use in the instant invention in place of naturally occurring clays. However, by virtue of the ready availability of large quantities of the natural clays at low prices, natural clays will generally be used in the practice of the present invention.

U.S. Pat. Nos. 3,798,177 and 4,060,480 disclose the preparation of hydroxy- aluminum modified smectite clays wherein a gibbsite-like layer is formed between the crystalline layers of the clay. The gibbsite-like layer is characterized by 14 Å spacing, is continuous and does not substantially increase the internal pore volume of the modified clay material.

U.S. Pat. No. 4,060,480 discloses a process for the preparation of a crystalline catalyst support via the steps of treating montmorillonite clay with a hydroxy-aluminum solution. Clay, after contact with such solution, flucculation, removal from the solution by filtration, is then suspended in fresh water and allowed to age. The aged hydroxy-aluminum treated clay slurry is refiltered and impregnated with catalytic materials such as palladium or other metals.

U.S. Pat. Nos. 4,176,090; 4,248,739; and 4,271,043 all discuss pillared interlayered clays which are prepared by reacting smectite clays with high molecular weight cationic metal complexes containing metals such as aluminum, zirconium, titanium and various alkaline earth metals. The high molecular weight complexes are prepared by hydrolysis or copolymerization of a metal complex such as aluminum chlorohydrol.

U.S. Pat. No. 4,216,188 teaches the production of montmorillonites cross-linked with aluminum hydroxide or with chromium hydroxide and a process for the production of those clays by the interaction of a colloidal suspension of montmorillonite and a buffered and aged colloidal solution of the aluminum or chromium hydroxide.

U.S. Pat. No. 4,367,163 discloses a method for intercalating smectite clays with various ionic silicon complexes such as silicon (acetylacetonato) cation. The imbibed clays are then subjected to heating to form silica pillars between the various sheets of the clay. Similar iron complexes have been introduced into clays to yield expanded structures. See, Yamanaka et al, Materials Res. Bull., 19 (1984), p. 161.

U.S. Pat. No. 4,410,751 discloses the production of a smectite host material having zirconium oxide intercalated therebetween. The zirconium oxide is said to be in the form of pillars. Other smallspacing, metal intercalated clays have been described by Brindley et al, infra.

U.S. Pat. No. 4,452,910 discloses expanded layer smectite clay having a regular pore structure suitable for catalytic uses. The patent also discloses a process for preparing that expanded clay by treating a suspension of the clay with a chromiumoligomer solution and then subjecting the thus-treated clay to a stabilization heat treatment in an inert gas atmosphere.

The present invention is substantially different than each of the disclosures cited above in that it is concerned with a composition of matter having multimetallic pillars intercalated between layers of smectite clay. It is also concerned with a method for modifying smectite type materials in such a way as to produce a substantial micropore structure in the materials and yield novel catalytic and sorbent products having utility in the petroleum, chemical and related industries. The resulting properties may be viewed as being more characteristic of crystalline zeolites than of clays.

BRIEF DESCRIPTION OF THE INVENTION

The present invention relates to the preparation of pillared interlayered clays which may be obtained by reacting smectite type clays with polymeric cationic multimetal complexes. The pillared interlayered clays of the invention possess an internal microstructure which may be established by introducing discrete and non-continuous inorganic oxide particles or pillars having a length between about 6 and 16 Å, between the clay layers. These pillars serve to hold the space between the clay layers open after removal of included water and serve to form an internal interconnected micropore structure throughout the inner layer in which the majority of the pores are less than about 30 Å in diameter.

Typically, the invention relates to thermally stable interlayered clays having interlayer spacings up to about 16 Å and whose pillars contain more than one type of metal atom. The product interlayered clay may be produced by reacting a naturally occurring or synthetic smectite type clay with a polymeric cationic hydroxy multimetal complex, the complex being produced by reacting certain metal-containing compounds with materials such as aluminum chlorohydroxide complexes ("chlorohydrol"), and heating to convert the hydrolyzed polymer complex into an inorganic multimetal oxide. The polymeric cationic hydroxy multimetal complex may be, of course, produced in a variety of other ways including introduction of the additional metals into the initial acidic aluminum solutions used in polymer synthesis.

DESCRIPTION OF THE PREFERRED EMBODIMENTS

Figure 1:
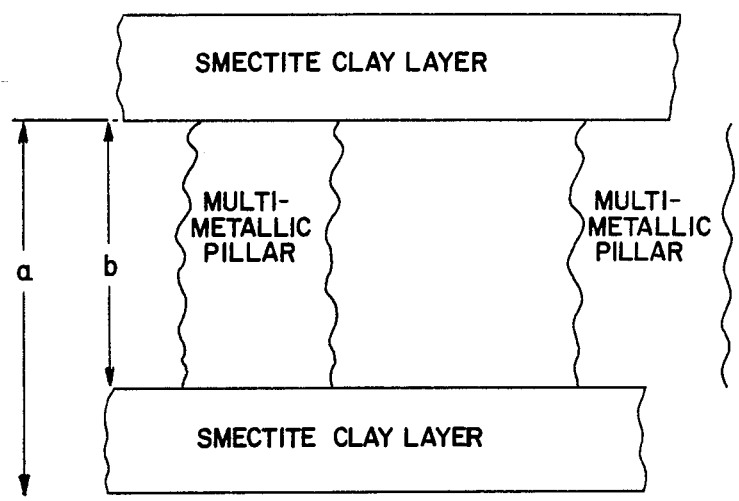
FIG. 1 represents a schematic cross-sectional view of the structure of a typical smectite type clay which has been treated with polymeric cationic hydroxy multimetal complex to form a pillared interlayer between the clay layers.

To obtain the novel pillared interlayered clay products of the invention, the following general procedure may be used:

(1) a cationic polymer of the type believed to be $(Al_{13}O_4(OH)_{24})^{7+}$, having a globular structure as first described by Johansen, Acta. Chem. Scand., v. 14 (1960), p. 771, is reacted in aqueous solution with a fourth, fifth or sixth period transition metal. These will primarily be from Groups 5B, 6B, 7B and 8 of the Periodic Table. The base multiatomic complex is thought to be of the type:

$$Al^{iv}Al_{12}{}^{vi}O_4(OH)_{24}{}^{+}.$$

One or more of the noted elements may be substituted into either or both of the iv or vi coordinate sites. The general formula for the substituted molecule may be represented as:

$$N^{iv}(Al_{12-x}M_x)^{iv}O_4(OH)_{24}{}^{+a}$$

where N may be $Al^{3+}$, $Si^{4+}$, $Ga^{3+}$, $Ge^{4+}$, $As^{5+}$, $P^{5+}$, $Cr^{3+}$, $Fe^{3+}$, $V^{5+}$, $Ru^{3+}$, $Ru^{4+}$, $Ni^{3+}$; M may be one or more of the elements of Groups 5B, 6B, 7B and 8 of the 4th, 5th or 6th Periods of the Periodic Table. The value for "x" may be from about 1 to about 6. The value for "a" depends upon the nature of the metal substitutions. Representative multimetal cationic polymer complexes include:

$$(Fe^{iv}(Al_{10}Cr_2)^{vi}O_4(OH)_{24})^{7+}$$

$$(Al^{iv}(Al_9Fe_3)^{vi}O_4(OH)_{24})^{7+}$$

$$(Al^{iv}(Al_{10}Ni_2)^{vi}O_4(OH)_{24})^{5+}.$$

Obviously, such substitutions may change the charge on the polymer molecules. Depending upon the solution pH, such multimetallic molecules may be hydrolyzed to produce lower charged species as indicated by Vaughan et al, Proc. 5th Intl. Zeolite Conf., (1980), p. 94.

Other methods for producing $(Al_{13})^{7+}$ are discussed below and may be used as an alternative to beginning with a commercial solution of lower aluminum chlorohydrol.

(2) A smectite clay is mixed with the aqueous solution of polymeric cationic hydroxy multimetal complex formed in step (1), in amounts so that the weight ratio of clay to metal complex solution is from 1:2 to 1000. The metal complex solution will preferably contain from about 1 to about 40% by weight solids in a suitable liquid medium such as water.

(3) The mixture of clay and metal complex is maintained at a temperature of about 5° to about 200° C. for a period of 0.1 to 4.0 hours.

(4) The reacted clay solids are recovered and heated at a temperature of from about 200° to about 700° C. to decompose the hydrolyzed metal complex to a pillar believed to be of multiple metallic oxides or hydroxides.

The clays which are suitable for use as starting materials in the present invention are the group of minerals known as smectites and are generally described above in the Background of the Invention. An extensive discussion of these materials is given in "Crystal Structures of Clay Materials and Their X-Ray Identification", edited by G. W. Brindley et al, (Mineralogical Soc.), 1980.

The inorganic metal polymers that are used as starting material for production of the multimetal polymers are generally known as basic aluminum complexes which are formed by the hydrolysis of aluminum salts. While there is inevitably some disagreement on the nature of the species present in hydrolyzed metal complex solutions (or suspensions), it is generally believed that these mixtures contain highly charged cationic complexes with several metal ions being complexed.

The hydrolysis of cations brings about polymers through a process called olation. For aluminum this process is described by C. L. Rollinson in Chemistry of the Coordination Compounds, edited by J. C. Bailar, Reinhold Publishing Corp., New York, 1956 as follows:

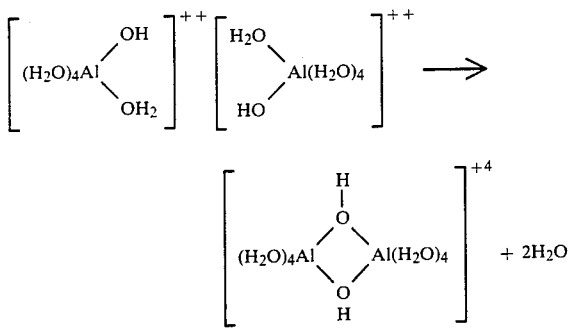

In this process, single or double OH⁻ bridges can be formed between Al ions. In less acidic solution, larger polymers are formed by the process and the bridging OH⁻ can be converted to a bridging O⁻², a process called oxolation. Note that a doubly OH bridged complex is a pair of edged-sharing octahedra, and this is the same type of structure found in boehmite, AlOOH, where the OH⁻ groups at the surface of the layers are each shared by two $AlO_6$ octahedra. In hydrargillite, $Al(OH)_3$, all oxygen are also shared between two $AlO_6$ octahedra. Various methods that have been used to produce Al polymers are discussed in U.S. Pat. No. 4,176,090, supra.

However, for the purposes of making the novel substituted clays of the invention, mixtures of aluminum salts and transition metal salts are used.

The metal ions may either be added to a solution already containing $(Al_{13})^{7+}$ polymers or may be added to a solution in which those polymers are being formed. Either method appears to produce similar mixed metal polymers. The present work is concerned only with the transition metal cationic substituted forms of $(Al_{13})^{7+}$ having the general formula:

$$N^{iv}(Al_{12-x}M_x)^{vi}O_4(OH)_{24+a}$$

where N may be $Al^{3+}$, $Si^{4+}$, $Ga^{3+}$, $Ge^{4+}$, $As^{5+}$, $P^{5+}$, $Cr^{3+}$, $Fe^{3+}$, $V^{5+}$, $Ru^{3+}$, $Ru^{4+}$, $Ni^{3+}$ or a mixture; M may be one or more of the elements selected from Groups 5B, 6B, 7B and 8 of the 4th, 5th or 6th Periods of the Periodic Table. These metals include V, Cr, Mn, Fe, Co, Ni, Nb, Mo, Tc, Ru, Rh, Pd, Ta, W, Re, Os, Ir and Pt. The value for "x" may be from about 1 to 6. The value for "a" depends upon the metal substitutions.

The preferred material is that when N is Al or Al and Ru and M is selected from V, Cr, Mn, Fe, Co, Ni or a mixture of these metals.

The polymers described above may be exchanged into smectite-type clays by cation exchange or other methods of imbibition to form expanded clays. Typically the clay will be finely ground and slurried in an excess of water. The multimetallic polymer is also added in a large amount to the clay slurry. The mixture is then aged for a period of time sufficient to allow introduction of the polymer to a position between platelets of the host clay.

Referring to the drawing, FIG. 1 represents a typical smectite which has been treated with the multimetal complex polymers in accordance with the teachings of this invention and have a repeat distance A of about 16 to about 24 Å. The distance B between layers ranges between 6 and 16 Å. The height of the pillar b is established when the pillared multimetal complex polymer which is inserted between the clay platelets is decomposed by calcination at temperatures between about 200° and 700°. The distance as shown in the drawing may readily be obtained from X-ray diffraction pattern for the various products and represent the first-order basal reflection parameter, i.e., 001.

It should be understood that within a given clay structure, the layers are not uniform but instead form a heterogeneous chemical mixture in which the exact composition of one layer may be somewhat different from that adjacent layer. This would be expected to result in slight variations in charge between layers, and therefore, slight differences in the amount of polymer exchange in different layers. Since the size of the multimetal polymer is the controlling factor in setting the inner layer distance, charge heterogeneity on the layers would only affect the number of polymer species between the layers, that is to say, the number of pillars but not their size.

In general, the calcined products of the invention will have interlayer spacing of about 6 to about 16 Å, a nitrogen BET surface area of about 150 to 600 m²/gram, and a nitrogen pore volume of from about 0.1 to about 0.6 cc/g. Furthermore, the novel pillared multimetal interlayered clay composition possess a substantial internal micropore structure, reflected by the nitrogen pore size distribution analyses which show a major fraction of pores in the range of less than 25 Å. The pillars themselves, in that they are produced by heating the multimetallic polymers discussed above, must contain some aluminum. A portion of the aluminum may be replaced by a number of semi metals or metals, as discussed above, i.e., $N^{1v}$ may be one or more of Al, Si, Ga, Ge, As, P, Cr, Fe, V, Ru, or Ni in the cationic multimetal polymer. Furthermore, a substantial portion of the metal compound in the pillar must be at least one or more of V, Cr, Mn, Fe, Co, Ni, Nb, Mo, Tc, Ru, Rh, Pd, Ta, W, Re, Os, Ir or Pt. The $M_x$ component of the polymer intermediate is the source of these metals. The compound in the pillars is believed to be, after calcination, mostly an oxide of a simple or complex type. Some hydroxide may remain, however, These interlayered products are useful as adsorbents, catalytic supports and in many instances as catalysts. Furthermore, it is contemplated that the interlayered clay products may be combined with other inorganic oxide adsorbents and catalysts, such as silica, alumina, silica-magnesia, silica-alumina, hydrogel, natural or synthetic zeolites, and clays. These compositions may be useful in the preparation of catalysts which contain other active or stabilizing metals such as platinum, palladium, cobalt, molybdenum, nickel, tungsten, rare-earths and so forth, as well as matrix components, such as silica, alumina, and silica-alumina hydrogel. The resulting catalysts may be used in conventional petroleum conversion processes, such as catalytic cracking, hydrocracking, hydrotreating, isomerization, reforming, in polymerization and other petrochemical processes, as well as in molecular sieve separations. It is contemplated that these compositions may be especially useful in preparing bifunctional catalysts wherein a primary metallic catalyst is introduced into the clay by ion exchange and a secondary functional catalytic material is incorporated in the pillars as a portion of the multimetal pillars.

Having described the basic aspects of the invention, the following specific examples are given to illustrate the preferred specific embodiments.

EXAMPLE 1

In this example, sufficient $Cr^{3+}$ was added to an aluminum chlorohydrol $Al_{13}O_4(OH)_{24}Cl_7$ ("chlorohydrol") solution to give a resulting theoretical pillar having a composition of $Al_{11}Cr_2O_4(OH)_{24}Cl_7$.

A 0.5 gm. $CrCl_3 \cdot 6H_2O$ sample was dissolved, at room temperature, in 20 gm. of a 50 wt. % aqueous chlorohydrol solution (Reheis Chemical Co.). The solution was stirred for 16 hours at 22° C., then heated for two hours at 100° C. A 10 gm. sample of Bentolite L smectite (Georgia Kaolin Co.) was added and the slurry stirred at 95° C. for 75 minutes. The mixture was filtered, and the blue-grey filter cake dried for 16 hours in a freeze dryer. X-ray diffraction analysis showed that about 30% of the clay had expanded to give an (001) layer spacing of 18.8 Å. In contrast, a similar sample of the clay exchanged only with a solution of $CrCl_3$, gave a green grey product that had an (001) reflection 15.1 Å. After calcination at 550° C. the polymer treated clay was a light tan-cream color, whereas the $Cr^{3+}$ exchanged clay was a grey-brown color.

EXAMPLE 2

A 0.5 gm. sample of $CrCl_3 \cdot 6H_2O$ was dissolved in 10 gm. $H_2O$ and mixed with a 20 gm. sample of chlorohydrol (as in Example 1). After aging for 16 hours at 22° C., the polymer solution was hot-aged for 75 minutes at 95° C. A 10 gm. sample of Bentolite L smectite was added and the slurry agitated at 95° C. for 90 minutes. The clay was filtered, yielding a blue grey filter cake and a similarly colored filtrate. After freeze drying, the exchanged clay for 16 hours, the clay powder gave an x-ray diffraction (001) spacing of 18.2 Å (60%) and a spacing at 15.1 Å (25% indicating only $H_2O$ intercalation and 9.8 Å indicating no expansion). After calcination, the sample turned a light tan-cream color.

EXAMPLE 3

In this example, $Ni^{2+}$ is substituted into the pillar.

A 0.5 gm. sample of $NiCl_2 \cdot 6H_2O$ was dissolved in 20 gm. $H_2O$, and added to 20 gm. of a 50% wt. solution of chlorohydrol (Reheis Chemical Co.). The resulting mixture was stirred for ten minutes at room temperature. A 10 gm. sample of Bentolite L montmorillonite was added and the whole was stirred for 16 hours at 23° C. After filtration, the filter cake was freeze dried. X-ray diffraction showed the sample to have strong reflections at 21.7 Å and 11.8 Å. After calcination of the material at 450° C. for one hour, the sample was equilibrated at 88% RH. over a saturated solution of $CaCl_2$. Thermogravimetric analysis of this sample showed a total weight loss of 26 wt. %, 23 wt. % being lost below a temperature of 450° C. X-ray diffraction showed the sample to have a strong (001) reflection at 18.2 Å. Sorption of n-hexane showed a weight gain of 3.8 wt. %. After calcining in air for 2 hours at 650° C. and re-equilibrating with water at 88% RH for 2 hours, the sample sorbed 9 wt. % $H_2O$. If two $Ni^{2+}$ have replaced two $Al^{3+}$ in this experiment, the intercalated polymer will have a formula $[Al_{11}Ni_2O_4(OH)_{24}]^{5+}$.

Having thus described the invention and giving several examples in its practice, it should be apparent that various equivalents will be obvious to one having ordinary skill in this art and yet be within the purview of the claims appended hereon.

I claim as my invention:

1. A pillared smectite clay product having generally separated layers wherein the interlayer distances are substantially greater than a precursor of the same but non-separated clay and wherein the product includes multimetallic pillars comprised of a cationic polymeric complex of the formula $$N(Al_{12-x}M_x)O_4(OH)_{24}+a$$

where
N is Al, Si, Ga, Ge, As, P, Cr, Fe, V, Ru or Ni, or mixtures thereof,
M is V, Cr, Mn, Fe, Co, Ni, Nb, Mo, Tc, Ru, Rh, Pd, Ta, W, Re, Os, Ir, Pt, or mixtures thereof,
X is from about 1 to about 6, and a depends upon the selection of M and N,
which pillars separate said layers.

2. The product of claim 1 wherein N is Al.
3. The product of claim 1 wherein M is selected from the group consisting of V, Cr, Mn, Fe, Co, Ni, Ru and mixtures thereof.
4. The product of claim 3 wherein the metal is chromium.
5. The product of claim 3 wherein the metal is nickel.
6. The product of claim 1 wherein the pillars are substantially oxides.
7. The product of claim 6 wherein the pillars also contain at least one selected from the group of Si, Ga, Ge, As, P, Cr, Fe, V, Ru, Ni or a mixture thereof.
8. The product of claim 6 wherein the pillars comprise chromium and aluminum oxides.
9. The product of claim 6 wherein the pillars comprise nickel and aluminum oxides.
10. The product of claim 6 wherein the product possesses an interlayer distance of about 6 to 16 Å.
11. The product of claim 1 wherein the smectite is selected from the group consisting of hectorite, chlorite, bentonite, montmorillonite, beidellite and mixtures thereof.
12. A process for preparing an interlayered multimetallic pillared smectite clay product which comprises the steps of:
(a) reacting a smectite with an aqueous composition comprising a polymeric cationic hydroxy multimetal complex of the formula:

$$N(Al_{12-x}M_x)O_4(OH)_{24}+a$$

where
N is Al, Si, Ga, Ge, As, P, Cr, Fe, V, Ru, or Ni, or a mixture thereof,
M is V, Cr, Mn, Fe, Co, Ni, Nb, Mo, Tc, Ru, Rh, Pd, Ta, W, Re, Os, Ir, Pt, or a mixture thereof,
x is from about 1 to about 6, and
a depends upon the selection of M and N, and to produce an interlayered smectite product,
(b) separating the interlayered smectite product from the mixture.
13. The process of claim 12 wherein N is Al.
14. The process of claim 13 wherein M is selected from the group consisting of V, Cr, Mn, Fe, Co, Ni, Ru and mixtures thereof.
15. The process of claim 14 wherein M is chromium.
16. The process of claim 15 wherein M is nickel.
17. The process of claim 13 wherein said mixture is reacted at a temperature between about 5° and 200° C. for a period of from about 0.1 to about 4 hours.
18. The process of claim 13 wherein the interlayered smectite product is heated at a temperature of from about 200° to about 700° C.
19. The process of claim 13 wherein from about 0.05 to about 2.0 parts by weight of said metal complex is mixed with each part by weight of said smectite.

* * * * *